INVENTOR.
Boris Antipovitch

May 24, 1949.   B. ANTIPOVITCH   2,471,185
AUTOMATIC STARTER FOR ELECTRIC MOTORS
Filed Aug. 24, 1946   5 Sheets-Sheet 2
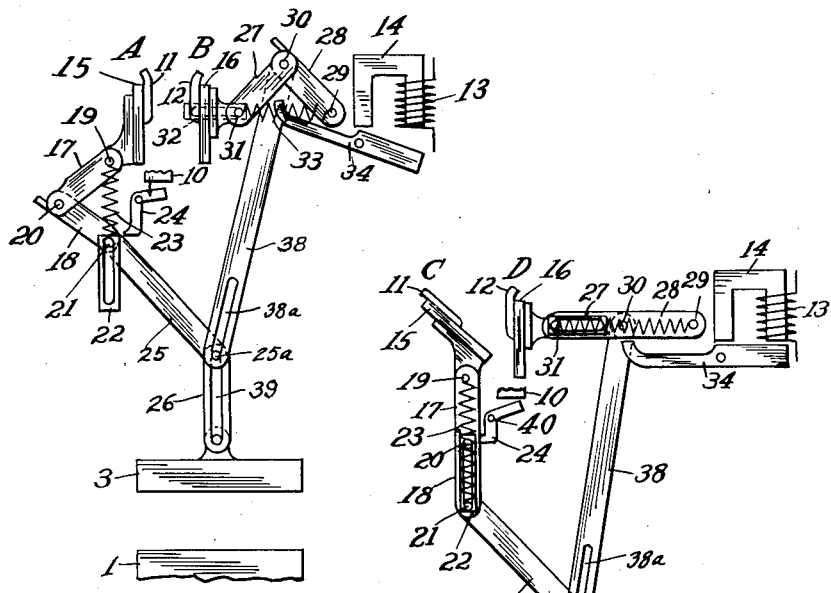
Fig. 2.
Fig. 3.
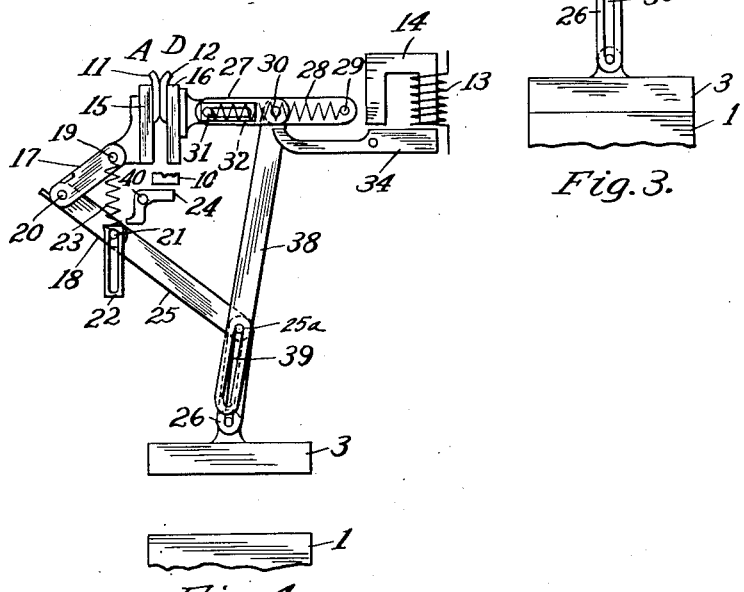
Fig. 4.
INVENTOR.
Boris Antipovitch
by his attorneys,
Christy, Parmelee & Strickland INVENTOR.
Boris Antipovitch
by his attorneys,
Christy, Parmelee & Strickland INVENTOR.
Boris Antipovitch May 24, 1949.                B. ANTIPOVITCH                2,471,185
                    AUTOMATIC STARTER FOR ELECTRIC MOTORS
Filed Aug. 24, 1946                                   5 Sheets-Sheet 5

INVENTOR.
Boris Antipovitch
by his attorneys
Christy, Parmelee & Strickland

Patented May 24, 1949

2,471,185

UNITED STATES PATENT OFFICE 2,471,185

AUTOMATIC STARTER FOR ELECTRIC MOTORS

Boris Antipovitch, Mexico City, Mexico

Application August 24, 1946, Serial No. 692,881

17 Claims. (Cl. 172—289)

This invention relates to a motor controller and, in particular, to an automatic apparatus for starting an alternating-current motor on reduced voltage and then transferring it to full voltage when it has accelerated substantially to full speed.

Various types of starters for alternating-current motors have been known heretofore and it is the object of my invention to improve generally on such devices and particularly to provide a simple, reliable starter which can be manufactured at relatively low cost and will function effectively and automatically under a wide variety of conditions to start induction motors or synchronous motors having amortisseur windings.

In a preferred embodiment, I provide a magnetic core having a gap or opening therein and an armature adapted to be attracted by the core when excited and moved into a position bridging said gap. An exciting winding on the core is adapted to be connected in series with the motor to be started and to apply reduced voltage thereto either by acting as a series reactor or as the secondary portion of an autotransformer or compensator. The armature actuates contacts effective finally to shunt the windings on the core and connect the motor directly to its supply lines upon a decrease in the starting current to a predetermined value. In one form of the invention and a modification thereof, these shunting contacts are preset by the attraction of the armature to the core and are finally closed by the release of the armature on reduction of the starting current as the motor comes up to speed. In another modification, the shunting contacts are those of a contactor, the closing coil of which is energized by release of the armature after first being attracted by the core. In still further modifications, the contactor is operated by the rise in voltage across the supply lines on the motor side of the starter as the starting current falls off.

A complete understanding of the invention may be obtained from the following detailed description and explanation which refer to the accompanying drawings illustrating the several preferred embodiments and modifications. In the drawings:

Figs. 2, 3 and 4 are elevations showing the several successive positions of a linkage actuated by the armature effective to close the contacts connecting the motor directly to its supply line, this linkage being omitted from Fig. 1;

Figure 1:
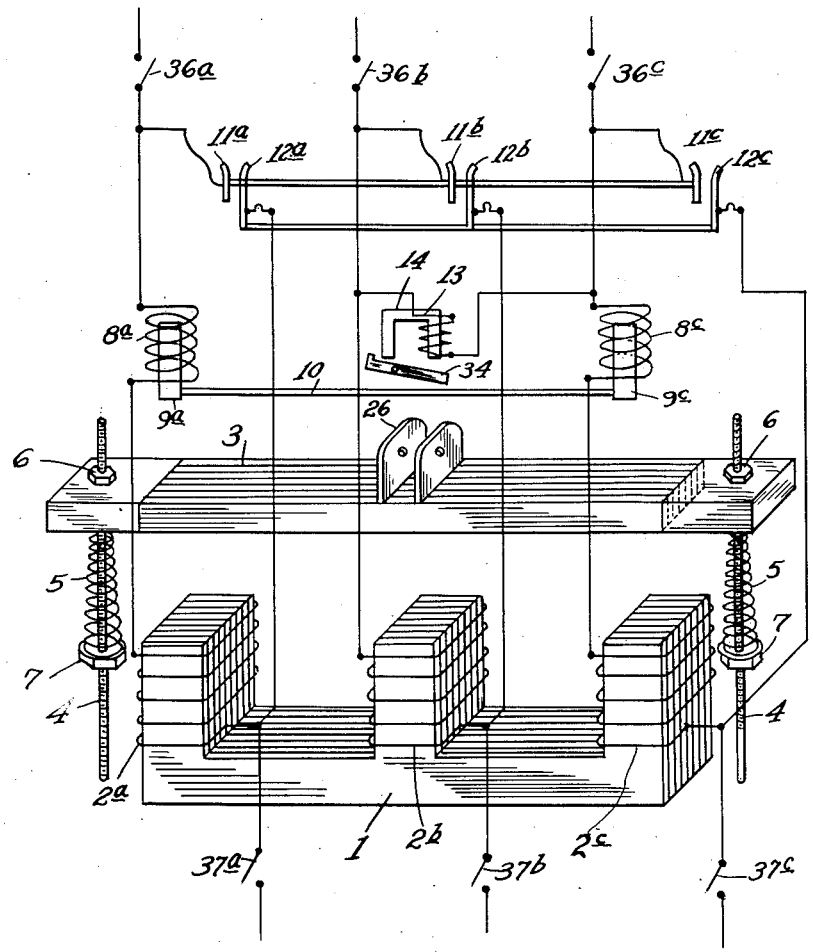
Fig. 1 is a perspective view of the magnetic core and armature showing diagrammatically the contacts actuated thereby and auxiliary control relays.
Figure 5:
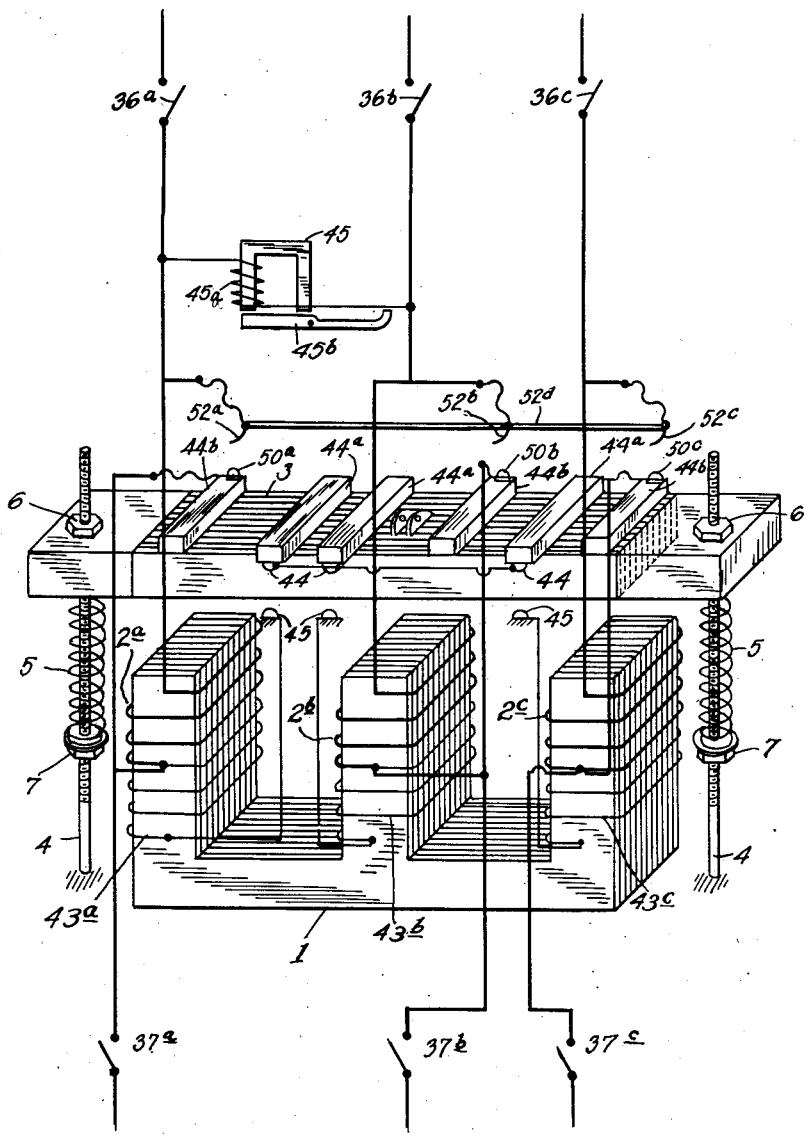
Fig. 5 is a view similar to Fig. 1 showing a modification in which the core has a secondary winding as well as an exciting winding.
Figure 6:
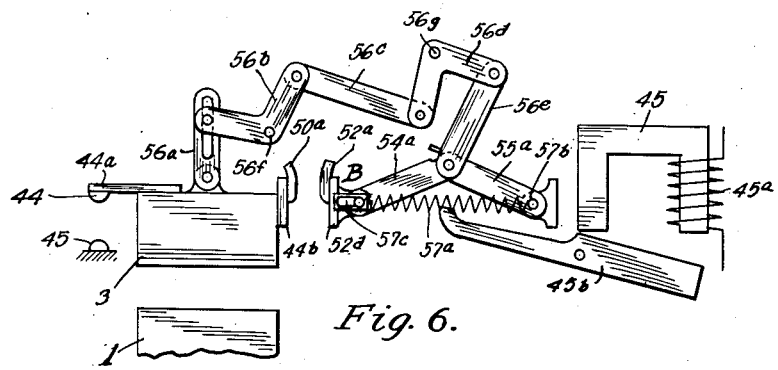
Figs. 6, 7 and 8 are similar to Figs. 2, 3 and 4 but relate to the modification of Fig. 5.
Figure 7:
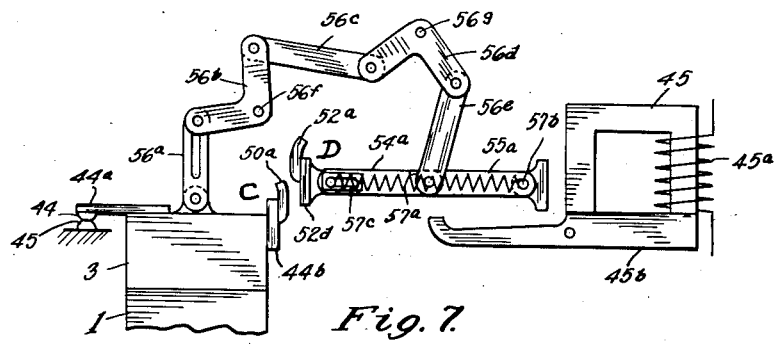
Figure 8:
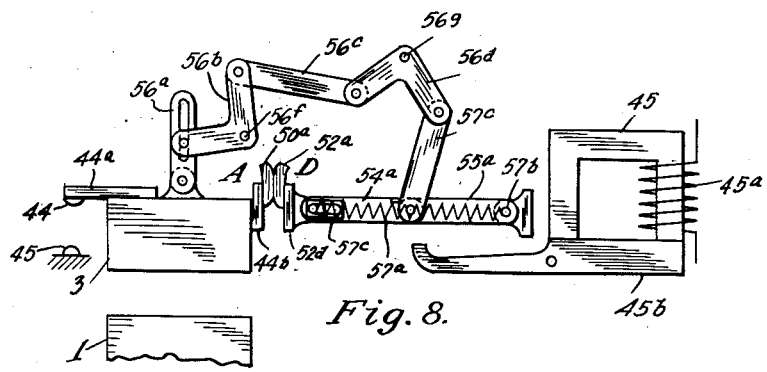

Referring in detail to the drawings, and for the present, to Figs. 1 through 5, one form of my invention comprises an E-shaped laminated core 1 with windings 2a, 2b and 2c on the legs thereof, respectively, adapted to be connected between the windings of a polyphase alternating-current motor and the lines of a three-phase supply source. An armature 3 is movable on guide rods 4 into and out of bridging engagement with the open side of the core, being attracted when the core is excited to a predetermined degree and released when the excitation decreases below the "hold-in" value. The armature is normally maintained in the illustrated position by compression springs 5 surrounding the rods, the springs yielding under the attractive force of the core when excited to permit movement of the armature into bridging engagement therewith. The rods 5 are threaded and nuts 6 and 7 turned thereon limit the upward and downward movements of the armature and permit adjustment of the initial compression of the springs. The reactance of the windings 2a, 2b and 2c is a minimum when the armature is in its upraised position to a maximum when it is in engagement with the core 1.

Relay windings 8a and 8c connected in series with windings 2a and 2c actuate cores 9a and 9c which together control a contact-tripping member 10. This member is effective by means to be described shortly, to cause final engagement of pairs of contacts, 11a and 12a, 11b and 12b, and 11c and 12c, shunting the reactor windings 2a, 2b and 2c and relay windings 8a and 8c, thereby applying full voltage to the motor when it has come up to speed. A no-voltage relay 14 in the form of a C-shaped core excited by a winding 13 has an armature 34 which, when released, causes opening of the contacts 11a, 12a, etc., by means which also take part in the closing thereof, as shown in Figs. 2 through 4, to which reference is now made.

The two groups of contacts 11a, etc., and 12a, etc., are mounted respectively on blocks 15 and 16 of insulation and the contacts of each group are thus operated simultaneously. A link 17 connected to the block 15 and a link 18 form a toggle, the link 17 and block 15 being pivotal about a stationary pivot pin 19, and the links 17 and 18 being connected by a pivot pin 20. Link 18 has a pivot pin 21 slidable in a slotted guide 22 mounted on any suitable fixed support. A tension spring 23 normally tends to collapse the toggle links 17 and 18 when their common pivot pin 20 has been moved past dead center. This is accomplished by a pivotally mounted trigger 24. The trigger is so mounted as to receive a blow from member 10 when the latter is released by the decrease in the energization of windings 8a and 8c to a predetermined value. The toggle links are extended on descent of the armature 3 by a link 25 pivoted on pin 21 and a pin 25a slidable in a slot 39 in a link 26 which is pivoted on the armature. Extension of the toggle links moves contacts 11a, 11b and 11c from the position shown at A in Fig. 2 to the position shown at C in Fig. 3.

Contacts 12a, 12b and 12c are actuated by toggle links 27 and 28. Link 28 is pivoted on a fixed pin 29. A pin 30 is the pivot common to the two links. A pin 31 through link 27 is slidable in a slotted guide 32 and connects the link to block 16. A tension spring 33 normally tends to collapse the links when the common pivot pin 30 is actuated past dead center. This is accomplished by a finger extending rearwardly from the pivoted armature 34 normally held up by energization of relay 14. The toggle links 27 and 28 are extended on descent of armature 3 by a link 38 pivoted to pin 30 and pin 25a. The link 38 has a slot 38a in the lower end thereof and a slot 39 is formed in link 26. These slots permit lost motion between links 26 and 38 and between links 25 and 26. When links 27 and 28 are extended, contacts 12a, 12b, and 12c are moved from position B shown in Fig. 2 to position D shown in Fig. 3.

A line switch having contacts 36a, 36b and 36c is located between the line and the starting apparatus described above. A disconnect switch having contacts 37a, 37b and 37c is located between the starter and the motor or load. Assuming the disconnect switch to be closed, the motor may be started simply by closing the line switch. The first result of this operation is the excitation of the core 1 and attraction of the armature 3. A limited current flows through the motor windings, the voltage applied thereto being reduced by the impedance drop through windings 2a, 2b and 2c, the reactance of which is a maximum when the armature is attracted. The relay windings 8a and 8c are energized by this current and raise their armatures and member 10. Relay 14 also lifts its armature 34 when voltage is applied to the winding 13. This voltage is the same as that applied to the motor windings.

The descent of armature 3, as above explained, moves contacts 11a, 12a, etc., from their normal open positions A and B respectively, to positions C and D preparatory to final closing. This closing is delayed, however, until the current through windings 8a and 8c is reduced to a predetermined minimum as the back E. M. F. of motor builds up on acceleration of its rotor. As the motor starting current decreases, armature 3 is lifted from core 1 by springs 5. This reduces the reactance of windings 2a, 2b and 2c and increases the voltage applied to the motor windings causing the rotor to be further accelerated. Because of the lost motion permitted by slots 38a and 39 in links 38 and 26, however, contacts 11a, 12a, etc., are not affected by lifting of the armature. These contacts are closed when the motor current decreases further to such a value that windings 8a and 8c drop their armatures 9a and 9c. Member 10 thereupon strikes trigger 24 which turns on its pivot 40 and trips toggle linkage 17, 18. The resulting collapse of the linkage turns block 15 back to position A and since block 16 remains in position D, contacts 11a, 12a, etc., are engaged. This shunts windings 2a, 2b, and 2c as well as windings 8a and 8c and connects the motor directly across the line. On failure of the voltage for any reason, relay 14 drops its armature 34 tripping toggle linkage 27, 28 and causing contacts 12a, 12b, and 12c to be retracted to position B. This restores the initial conditions and the starting apparatus will again function in the manner explained on restoration of the voltage.

Figs. 5 through 8 show a modified form of starting apparatus generally similar to that described above except that it utilizes auto-transformer action for applying a reduced voltage instead of a series impedance. As shown in the drawings, the core 1, in addition to series windings 2a, 2b and 2c, has shunt windings 43a, 43b and 43c adapted to be connected in star by engagement of contacts 44 on the armature with fixed contacts 45, when the armature is attracted as a result of the initial excitation of the core. Contacts 44 are mounted on blocks 44a of insulation carried by the armature 3. When windings 43a, etc. are energized, they cause a low starting voltage to be applied to the motor windings by including in windings 2a, etc., a voltage in opposition to that of the line. A no-voltage relay 45 having a winding 45a and an armature 45b is responsive to the voltage applied to the motor.

Shunting contacts 50a, 50b and 50c carried on insulation blocks 44b on the armature 3 are adapted to engage contacts 52a, 52b and 52c mounted on an insulation block 52d. Block 52d is controlled by toggle links 54a and 55a similar to links 27 and 28. This linkage is extended by a link 56a pivoted to armature 3, a bell crank 56b, a link 56c, a bell crank 56d and a link 56e. The bell cranks are pivoted on fixed pins 56f and 56g. The toggle links 54a and 55a are operated by a spring 57a. The link 55a pivots on a fixed pivot 57b, and the link 54a has a guided slide movement in the slotted guide 57c. The initial descent of the armature 3 thus causes contacts 51a, etc., to move from position A to Fig. 6 to position C of Fig. 7 and extends the toggle linkage 54a, 55a thus moving contacts 52a, etc., from position B of Fig. 6 to position D of Fig. 7. While the armature is attracted to the core 1, the motor starts under reduced voltage and relay 45 attracts its armature 45b. When the starting current is reduced by the back E. M. F. of the motor as it comes up to speed, core 1 is released. This causes disengagement of contacts 44 and 45 and moves contacts 50a, etc., from position C of Fig. 7 to position A of Fig. 8 in which they engage contacts 52a, etc., which remain unmoved by reason of the slot in the link 56a which permits lost motion thereof relative to bell crank 56b.

Full voltage is thus applied to the motor windings. Failure of line voltage for any reason causes relay 45 to drop its armature 45b thereby tripping toggle linkage 54a, 55a and restoring initial conditions.

Figure 9:
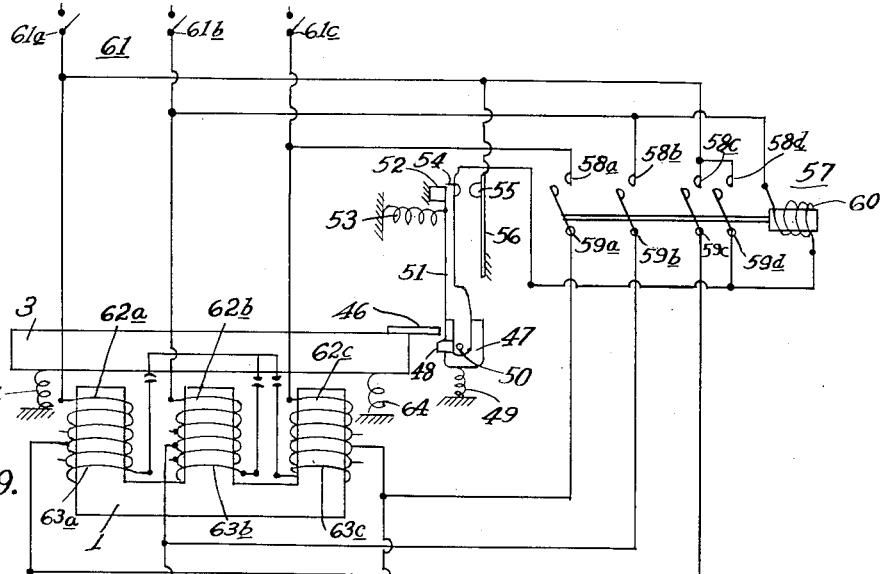
Fig. 9 is a circuit diagram showing the modification in which the full-voltage or shunting contacts are those of a contactor controlled by the armature of the starting apparatus.
Figure 10:
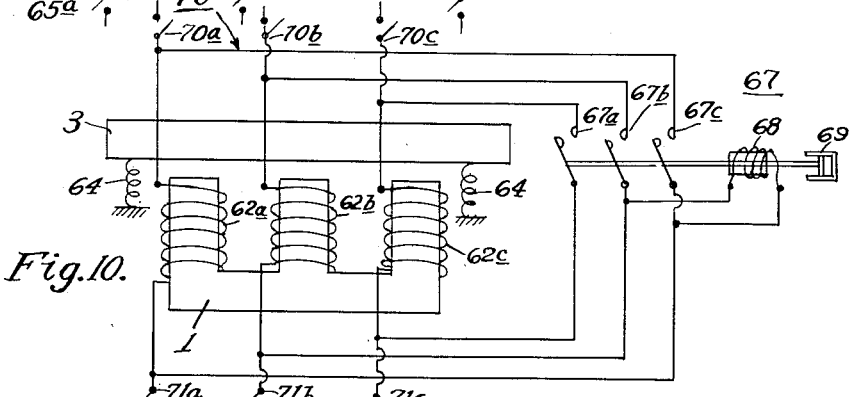
Fig. 10 is a diagram similar to Fig. 9 showing a further modification.

Figs. 9 and 10 show two further modifications, each of which may be applied to both the reactor and the reactor-auto-transformer type of starter and consists of an electromagnetic switch controlled by the movement of the armature thereof.

Fig. 9 illustrates a magnetic switch 57 controlled by an auxiliary switch. On the movable armature 3 of core 1 an actuating member 46 is mounted. A rocker element 47 is rotatably mounted on a fixed pivot 50 and has a projection 48 engaged by member 46 on the armature 3 when it is moved downwardly. Spring 49 normally biases element 47 toward the position indicated. On the same shaft 50 arm 51 is mounted and is held against a stop 52 by spring 53. A contact 54 is fixed to the end of arm 51 and a cooperating contact 55 is fixed to the end of a flexible leaf spring 56.

Electromagnetic switch 57 includes contacts 58a, 58b and 58c which are connected to the line side of the electromagnet coils wound on core 1, and the cooperating contacts 59a, 59b and 59c are connected to the motor side of these coils. Solenoid 60 effects closing of the contacts when it is energized. One end of solenoid 60 is connected to the line switch contact 61b and another end to the contact 54 of the auxiliary switch. Contact 55 is connected to the line switch contact 61a. Auxiliary contact 58d is connected to the line switch contact 61a and the other auxiliary contact 59d is connected to the other end of coil 60.

The operation of the circuit is as follows:

When line switch contacts 61a, 61b and 61c are closed, lines 61 are energized and current flows through coils 62a, 62b and 62c and through closed contacts 65a, 65b and 65c to the motor. Magnetic flux traverses core 1 and armature 3 is moved toward the core 1, compressing springs 64. As a result of such movement, member 46 engages projection 48 and rotates element 47 and arm 51 about shaft 50. At the end of the movement of armature 3, member 46 disengages element 47 and spring 49 restores it to its initial position.

After the motor has attained normal speed and the current is decreased to a predetermined value, spring 64 lift the armature 3 away from the core 1. In that movement the member 46 again comes in contact with the projection 48 of element 47 rotating it around the shaft 50 in an opposite direction. This causes the arm 51 also to rotate around the shaft 50 and close contacts 54 and 55. When the contacts 54 and 55 are closed the coil 60 is energized and closes switch 57, thus applying full line voltage to the motor. At the end of the movement, member 46 disengages element 47 and the spring 53 opens the contacts 54 and 55.

As the auxiliary contacts 58d and 59d are closed, the circuit of the coil is completed and the switch is held in position in spite of the fact that contacts 54 and 55 are opened. When the current is switched off the line, coil 60 releases the contacts of switch 17, preparing the circuit for the next operation.

Another system embodying an electromagnetic switch is illustrated in Fig. 10. Referring to the latter, electromagnetic switch 67 has its contacts 67a, 67b and 67c connected to the supply lines 70 and to one end of the coils 62a, 62b and 62c. The other ends of these coils are connected to the motor terminals through switches 71a, 71b and 71c and to the other contacts of the electromagnetic switch 67.

Coil 68 of switch 67 is connected directly across two of the motor terminals and has a dash-pot 69 connected to the armature or stem of switch 67.

The operation of the system is as follows:

When the line 70 is energized by closing switches 70a, 70b and 70c the contacts of switch 67 are open. Therefore the current flows through the coils 62a, 62b and 62c to the motor. Magnetic flux is developed in the core 1 and the armature 3 is attracted to the core 1 against the action of spring 64. At the same time the voltage is applied to the coil 68, but is reduced to a small value by the impedance of the coils on armature 1 and thereafter lowered further to the motor starting voltage as the armature 3 is attracted to the core 1. The time delay element or dash-pot 69 prevents the possibility of closing of the contacts of switch 67 at the first instant and the coil 68 cannot close the contacts of switch 67 at the reduced voltage. As the current through the coils of core 1 is reduced when the motor gains speed, the springs 64 lift the armature 3 away from the core 1. As the reactance of these coils is decreased and the current of the motor is reduced too, the voltage applied to the coil 68 becomes high enough to close the contacts of switch 67, short-circuiting the coils 62a, 62b and 62c and applying full line voltage to the motor.

As the lines 70 are deenergized, coil 68 drops out to effect opening of contacts 67.

Figure 11:
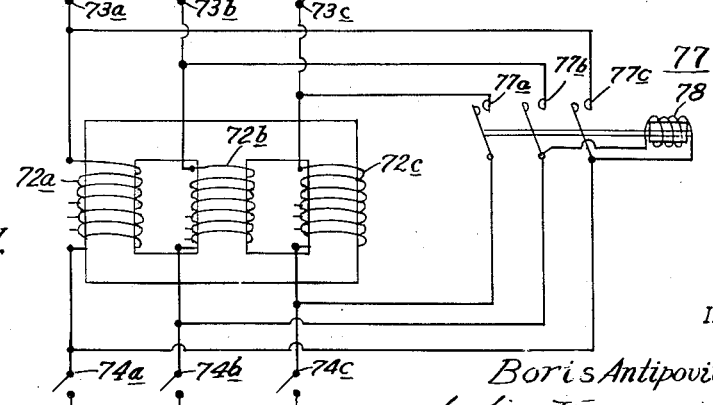
Fig. 11 is a circuit diagram of a starting device comprising a closed-core reactor and a shunting contactor controlled thereby.

A further modification of the automatic starter is shown in Fig. 11 using a reactor of the closed core type.

The circuit comprises a core 1 on the legs of which are wound coils 72a, 72b and 72c connected to the corresponding line contacts 73a, 73b and 73c, respectively, on one side and to the corresponding motor-side contacts 74a, 74b and 74c, respectively. The contacts 77a, 77b and 77c and their corresponding contacts of switch 77 are connected in parallel with the coils 72c, 72b and 72a respectively. Coil 78 of the magnetic switch 77 is connected to the motor contacts 74b and 74c.

The operation of the circuit is as follows:

When line switches 73a, 73b and 73c are closed to energize the line terminals the contacts of the switch 77 are open, hence current flows through the reactor coils 72a, 72b and 72c. As the motor draws the maximum current, the voltage to the motor is reduced to the minimum value, hence is unable to operate the magnetic switch 77. The motor starts slowly and as it gains speed, the current is reduced and at the same time, the drop of the voltage across the reactor is decreased, increasing the voltage on the motor and on the coil of the switch 77. When the current through the coils on core 1 drops to the predetermined value, increasing to a corresponding degree the voltage across the coil 78 of switch 77, contacts 77a, 77b and 77c are engaged by their cooperating contacts as switch 77 closes and full line voltage is then applied to the motor for normal operation.

When line switches 73a, 73b and 73c are opened to deenergize the supply lines, switch 77 drops open.

While I have illustrated and described certain specific embodiments of my invention, it will be understood that this is by way of illustration only and that various changes and modifications may be made within the contemplation of my invention and within the scope of the following claims.

I claim:

1. An automatic starting system for an alternating current motor comprising, in combination, a source of alternating current, electromagnet means including reactor coils connected in series with said source for limiting the motor starting current including an armature and spring means for biasing said armature away from said coils, and switch contacts operated by said armature for short-circuiting said reactor coils upon a predetermined decrease in motor current flow as the motor increases in speed.

2. An automatic starting system for an alternating current motor comprising, in combination a source of alternating current, electromagnet means including reactor coils connected in series with said source for limiting the motor starting current including an armature and spring means for biasing said armature away from said coils, a toggle operated switch having an operating connection with said armature for short-circuiting said reactor coils upon a predetermined decrease in motor current flow as the motor increases in speed, and a second electromagnet operable to trip said toggle operated switch and break said short circuit in response to interruption of current flow from said source.

3. An automatic starting system for an alternating current motor comprising, in combination, a source of alternating current, electromagnet means including reactor coils connected in series with said source for limiting the motor starting current including an armature and spring means for biasing said armature away from said coils, and switch contacts operated by said armature for short-circuiting said reactor coils upon a predetermined decrease in motor current flow as the motor increases in speed, a plurality of shafts for guiding the movement of said armature towards and away from said coils, a spring encircling each shaft, and a stop means for one end of the corresponding spring and the other stop means for limiting the movement of the armature away from said coils.

4. An automatic starting system for an alternating current motor comprising, in combination, a source of alternating current, electromagnet means including reactor coils connected in series with said source for limiting the motor starting current including an armature and spring means for biasing said armature away from said coils, a toggle operated switch having an operating connection with said armature for short-circuiting said reactor coils upon a predetermined decrease in motor current flow as the motor increases in speed, said toggle operated switch including a plurality of pairs of switch contacts, spring operated toggle means connected to one of said pairs of switch contacts and a second spring operated toggle means connected to the other of said pairs of switch contacts, linkage means for connecting both said aforementioned toggle means to said armature, and a second electromagnet for rendering one of said toggle means operative to open said switch upon interruption of current flow from said source.

5. An automatic starting system for an alternating current motor comprising, in combination, a source of alternating current, a magnetic core having a plurality of legs, a coil around each leg and connected in series with one of the lines of said source, switch means for short-circuiting said coils, a second coil wound around each leg, an armature suspended by spring means biasing said armature away from said coil, a second switch means operable by movement of said armature towards said core to insert said second coils in circuit and convert said core and coils to an auto-transformer thereby reducing the voltage applied to the motor in accordance with the ratio of turns of said first and second coils.

6. An automatic starting system for an alternating current motor comprising, in combination, a source of alternating current, a magnetic core having a plurality of legs, a coil around each leg and connected in series with one of the lines of said source, switch means for short-circuiting said coils, a second coil wound around each leg, an armature suspended by spring means biasing said armature away from said coil, a second switch means operable by movement of said armature towards said core to insert said second coils in circuit and convert said core and coils to an auto-transformer thereby reducing the voltage applied to the motor in accordance with the ratio of turns of said first and second coils, a plurality of shafts for guiding the movement of said armature towards and away from said coils, a spring encircling each shaft, and a stop means for one end of the corresponding spring and the other stop means for limiting the movement of the armature away from said coils.

7. An automatic starting system for an alternating current motor comprising, in combination, a source of alternating current, a magnetic core having a plurality of legs, a coil around each leg and connected in series with one of the lines of said source, switch means for short-circuiting said coils, a second coil wound around each leg, an armature suspended by spring means biasing said armature away from said coil, a second switch means operable by movement of said armature towards said core to insert said second coils in circuit and convert said core and coils to an auto-transformer thereby reducing the voltage applied to the motor in accordance with the ratio of turns of said first and second coils, said first mentioned switch means including toggle means connected to said armature and a spring for operating said toggle means, electromagnetic tripping means responsive to a drop in voltage across said source for causing said spring to operate said toggle means and re-open said first mentioned switch means after closure thereof during the motor starting operation.

8. An automatic starting system for an alternating current motor, comprising a source of alternating current, electromagnet means including reactor coils connected in series with said source for limiting the motor starting current, including an armature and springs means for urging said armature away from said coils, an auxiliary switch operated by the said armature upon a predetermined decrease in motor current flow as the motor increases speed, an electromagnet means operated by said auxiliary switch including a plurality of pairs of switch contacts, one for each line of the source for short-circuiting the said reactor coils after the motor has attained its normal current.

9. An automatic starting system for an alternating current motor, comprising a source of alternating current, electromagnet means including reactor coils connected in series with said source for limiting the motor starting current, including an armature and spring means for urging said armature away from said coils, an electromagnetic switch means for short-circuiting the reactor coils connected to the motor terminal and operated by the increase of the voltage on the motor terminals after the current to the motor is decreased to a predetermined value.

10. An automatic starting system for an alternating current motor comprising, in combination, a source of alternating current, a magnetic core having a plurality of legs, a coil wound around each leg and connected in series with one of the lines of said source, electromagnetic switch means for short-circuiting the said coils, a second coil wound around each leg, an armature suspended by spring means urging said armature away from said coil, a second switch means operable by movement of said armature towards said core to insert the second coils in circuit and convert said core and coils to an auto-transformer, thereby reducing the voltage applied to the motor in accordance with the ratio of turns of said first and second coils, an auxiliary switch actuated by the movement of said armature to operate the first mentioned electromagnetic switch means and being connected to the motor terminals and operated by the increase of the voltage while the current to the motor is decreased to the predetermined value.

11. Starting apparatus for an alternating-current motor comprising a magnetic core having a gap therein, an exciting winding on said core adapted to be connected in series with the motor for starting, an armature adapted to bridge said gap when attracted by excitation of the core, means opposing attraction of the armature by the core, switch contacts shunting said winding when engaged, and means rendered operative by movement of said armature away from said core on a predetermined reduction of the current through the motor as it accelerates, causing engagement of said contacts.

12. Starting apparatus for an alternating-current motor comprising a magnetic core having a gap therein, an exciting winding on said core adapted to be connected in series with the motor for starting, an armature adapted to bridge said gap when attracted by excitation of the core, means opposing attraction of the armature by the core, switch contacts shunting said winding when engaged, means actuated by attraction of the armature to the core for presetting the contacts for engagement, and means actuated on a predetermined reduction in the current through the motor as it accelerates, causing engagement of said contacts.

13. Starting apparatus as defined by claim 12 characterized by said last-mentioned means being actuated by said armature.

14. Starting apparatus as defined by claim 12 characterized by said last-mentioned means being an electro-magnetic trip.

15. An automatic starting system for an alternating current motor comprising, in combination, a source of alternating current, electromagnetic means comprising a core having a group of coils wound therearound, and a movable armature normally biased away from said core, each of said coils being connected in series with a terminal of said source and a motor terminal, a second group of coils wound on said core, a switch operable by attraction of said armature to said core for converting said groups of coils and said core from a voltage limiting reactor into an auto-transformer, and means responsive to attainment of a predetermined speed and terminal voltage of said motor for short-circuiting said first group of coils to apply full line voltage to said motor.

16. An automatic starting system for an alternating current electric motor comprising, in combination, a source of alternating current, electromagnetic means comprising a core having a plurality of legs corresponding to the number of phases of the alternating current source, and a movable armature adapted to bridge the extremities of said legs, spring means for biasing said armature away from said core, a plurality of coils, each wound around a leg of said core and connected in series with a terminal of said source and a terminal of an alternating current motor, a second plurality of coils, each wound around one of said legs and having one terminal connected to the corresponding first mentioned coils, a switch operable by said armature for interconnecting the other terminals of said last mentioned coils, which switch, when closed, will convert the coils and core into an autotransformer for reducing the voltage applied to the motor in accordance with the ratio of turns of said first and second mentioned coils and when open, will convert the core and coils into a reactor of variable reactance, depending upon the length of air gap between the armature and legs of said core.

17. A system as recited in claim 16 including a magnetically operated switch having an operating coil connected in parallel with the motor for short-circuiting said first mentioned coils to apply full voltage to the motor after the motor has attained a predetermined speed and after the current has been reduced sufficiently to cause the armature to move away from the core and open said armature actuated switch.

BORIS ANTIPOVITCH.

REFERENCES CITED

The following references are of record in the file of this patent:

UNITED STATES PATENTS

| Number | Name | Date |
|---|---|---|
| 1,096,922 | Korndorfer | May 19, 1914 |
| 1,511,344 | James | Oct. 14, 1924 |
| 1,840,093 | Hardesty | Jan. 5, 1932 |
| 1,894,928 | Wesche | Jan. 17, 1933 |
| 2,247,655 | Fields | July 1, 1941 |

FOREIGN PATENTS

| Number | Country | Date |
|---|---|---|
| 21,357 | Great Britain | 1909 |
| 268,412 | Great Britain | Apr. 5, 1927 |
| 348,097 | Italy | May 11, 1937 |